(12) United States Patent
Sato

(10) Patent No.: US 7,678,006 B2
(45) Date of Patent: Mar. 16, 2010

(54) AUTOMATIC TRANSMISSION OF MOTOR VEHICLE

(75) Inventor: Tetsuya Sato, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 472 days.

(21) Appl. No.: 11/798,987

(22) Filed: May 18, 2007

(65) Prior Publication Data

US 2007/0281817 A1 Dec. 6, 2007

(30) Foreign Application Priority Data

May 30, 2006 (JP) ............................. 2006-149674

(51) Int. Cl.
*F16H 31/00* (2006.01)
*G06F 19/00* (2006.01)
(52) U.S. Cl. ......................... 475/132; 701/52
(58) Field of Classification Search .................... 701/56, 701/52; 475/123, 132
See application file for complete search history.

(56) References Cited

U.S. PATENT DOCUMENTS

| | | | |
|---|---|---|---|
| 4,891,759 A * | 1/1990 | Kato ........................... | 701/54 |
| 5,069,085 A * | 12/1991 | Iizuka ........................ | 477/119 |
| 5,269,204 A | 12/1993 | Moroto et al. | |
| 6,128,566 A | 10/2000 | Nishino | |
| 6,361,465 B1 | 3/2002 | Hirose | |
| 6,793,602 B2 | 9/2004 | Kaigawa et al. | |
| 7,530,923 B2 * | 5/2009 | Saito et al. ................. | 477/122 |

FOREIGN PATENT DOCUMENTS

| | | |
|---|---|---|
| DE | 199 16 917 A1 | 11/1999 |
| DE | 100 30 203 A1 | 1/2001 |
| DE | 102 48 398 A1 | 6/2004 |
| EP | 1 091 146 A1 | 4/2001 |
| JP | 5-044824 A | 2/1993 |
| JP | 7-174221 A | 7/1995 |
| JP | 9-89092 | 3/1997 |
| JP | 2003-314677 | 11/2003 |

* cited by examiner

*Primary Examiner*—Dirk Wright
(74) *Attorney, Agent, or Firm*—Foley & Lardner LLP

(57) ABSTRACT

A first data section is provided that has a given data actually used when a frictional element is operated under a manual shift mode for providing an engine brake, and a second data section is provided that is actually used when an automatic shift is carried out. A control unit is so configured that when, during a shift from a second speed stage to a first speed stage under the manual shift mode, a mode change from the manual shift mode to the automatic shift mode is instructed, releasing operation of the frictional element is carried out by using the given data of the first dada section.

9 Claims, 6 Drawing Sheets

FIG.2

|  | LOW/C | 3-5R/C | H/C | L&R/B | 2-6/B | LOW/OWC |
|---|---|---|---|---|---|---|
| 1ST | ○ |  |  | ⊗ |  | ⊙ |
| 2ND | ○ |  |  |  | ○ |  |
| 3RD | ○ | ○ |  |  |  |  |
| 4TH | ○ |  | ○ |  |  |  |
| 5TH |  | ○ | ○ |  |  |  |
| 6TH |  |  | ○ |  | ○ |  |
| REV |  | ○ |  | ○ |  |  |

⊗: ENGINE BRAKE

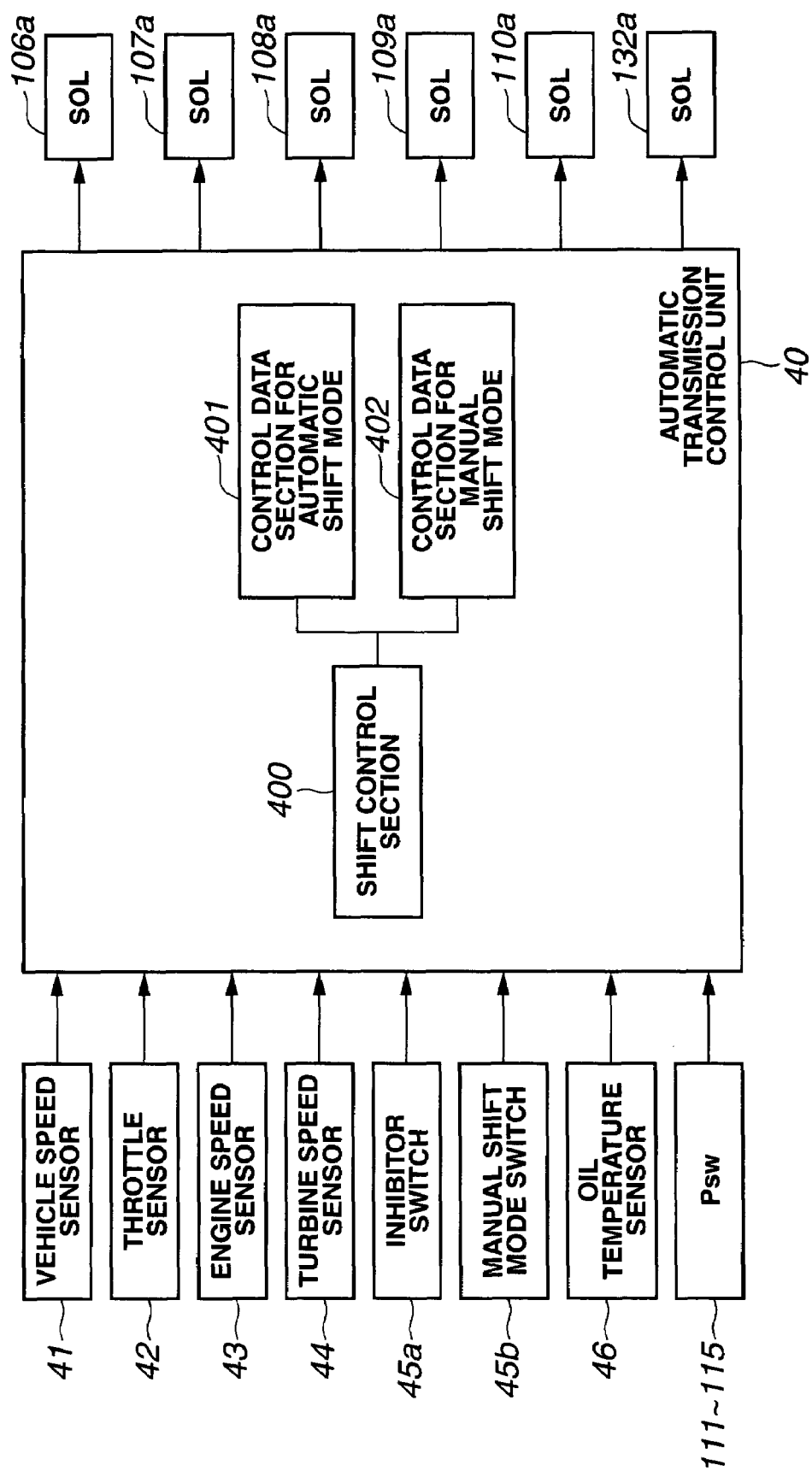

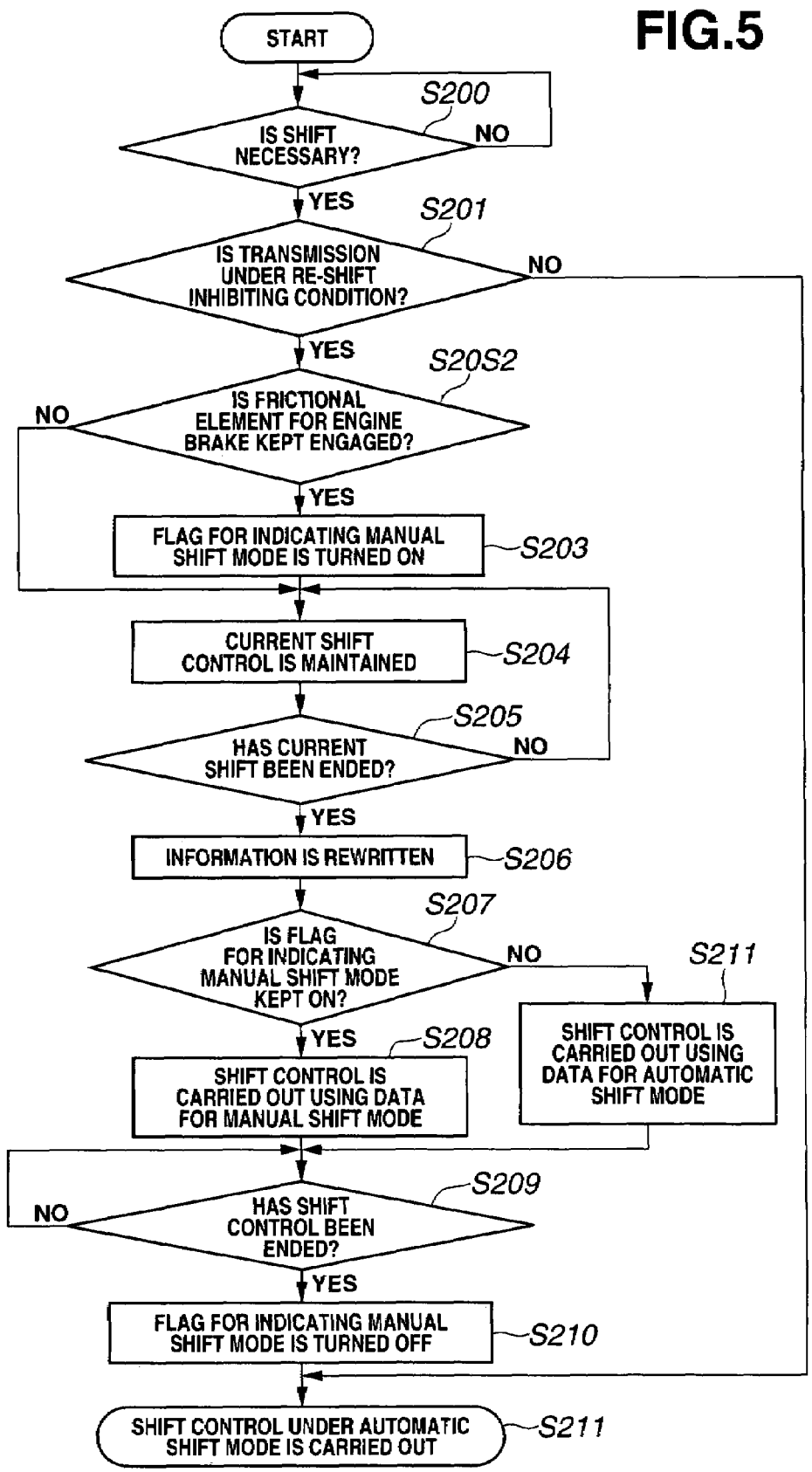

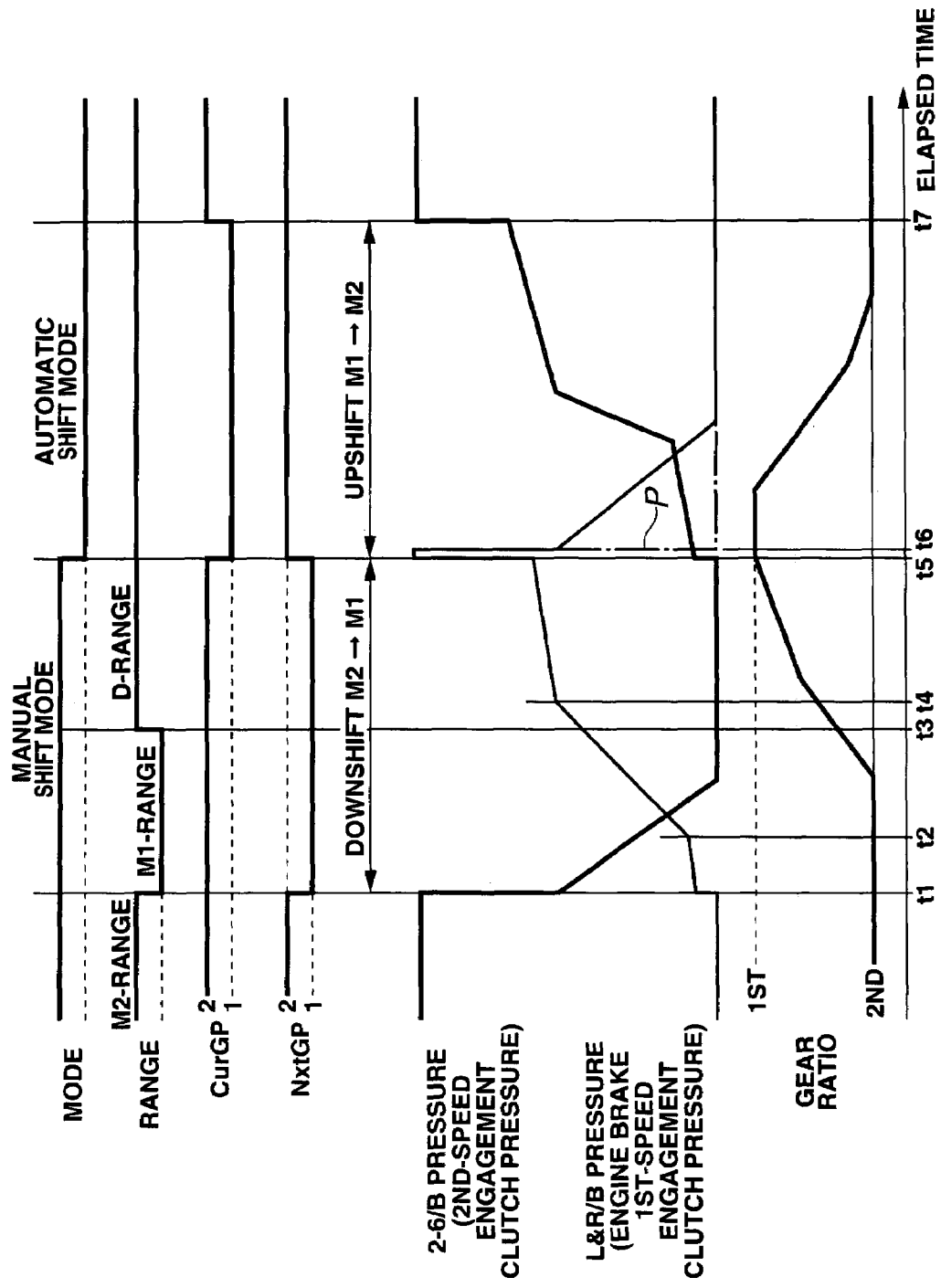

AUTOMATIC TRANSMISSION OF MOTOR VEHICLE

BACKGROUND OF THE INVENTION

1. Field of the Invention

The present invention relates in general to automatic transmissions of motor vehicles, and more particularly to a control for a frictional element of the transmission that is engaged when an associated motor vehicle is subjected to an engine brake.

2. Description of the Related Art

Hitherto, various automatic transmissions have been proposed and put into practical use in the field of wheeled motor vehicles. Some of them are of a type that establishes a desired speed (or desired shift stage) by engaging or disengaging clutches and brakes (viz., frictional elements) and has two operation modes that are switchable, one being a so-called engine brake operation mode (viz., a manual shift mode in which the shift is made manually) and the other being a so-called non-engine brake operation mode (viz., an automatic shift mode wherein the shift is made automatically).

In the automatic transmission of the above-mentioned type, when, under a shift operation of the manual shift mode toward a certain speed, a change to the automatic shift mode is intended and at the same time a shift instruction of the automatic shift mode does not match with the certain speed that has been aimed by the manual shift mode, it inevitably occurs that the frictional element (or clutch) for the engine brake that is about to be engaged is instantly released. However, in this case, interruption to an engine brake inevitably takes place, which makes the passengers in the vehicle, particularly the driver, feel uncomfortable.

For solving the above-mentioned drawback, it may be thought out that upon completion of shift in the manual shift mode, the automatic shift mode is forced to take place for executing a subsequent shift.

However, since the automatic shift mode is of a control that is not aimed for the engine brake, the mode is not provided with a data for controlling a hydraulic pressure of the frictional element used for the engine brake. Thus, upon switching to the automatic shift mode, the hydraulic pressure fed to the frictional element is instantly reduced thereby inducing an undesirable feeling of instant lack of engine brake. Furthermore, due to such instant reduction in hydraulic pressure, a shift shock is produced when a subsequent speed is about to be established.

For solving the above-mentioned drabacks, Japanese Laid-open Patent Application (Tokkaihei) 9-89092 and Japanese Laid-open Patent Application (Tokkai) 2003-314677 propose respective measures.

In the measures of the former Laid-open Application, when, under a shift operation from a first speed (where the frictional element for engine brake is engaged) to a second speed (where the frictional element for engine brake is disengaged), both a release instruction to the frictional element and a shift instruction to a third speed (where the frictional element for engine brake is engaged) are issued by a switching operation by the driver, the release operation for the frictional element for engine brake is suppressed to keep the existing condition and a shift from the first speed to the second speed and then a shift from the second speed to the third speed are carried out in order.

In the measures of the latter Laid-open Application, when, under a shift operation from a second low range L2 (where the frictional element for engine brake is engaged) to a first low range L1 (where the frictional element for engine brake is engaged), a so-called multiple shift instruction is issued for the change from the first low range L1 to the second low range L2, the engaged condition of the frictional element (viz., B-4 brake) for engine brake in the first speed is slowly released (viz., sweep down), and upon completion of the release operation, the shift from the first low range L1 to the second low range L2 is carried out and at the same time the frictional element (viz., B-2 brake) for engine brake in the second speed is slowly engaged.

SUMMARY OF THE INVENTION

However, the measures of the above-mentioned two Laid-open Applications have the following shortcomings.

That is, in a hydraulic control device employed in the automatic transmission of the former Laid-open Application, if the frictional element for engine brake takes the engaged condition before and after the shift, normal performance is obtained. However, if the frictional element for engine brake does not take the engaged condition after the shift and/or if the frictional element for engine brake is subjected to engagement only before or after the shift, the aimed control for keeping the engagement of the frictional element for engine brake is not achieved.

If, for controlling or releasing the frictional element for engine brake before and after the shift, it is necessary to prepare a hydraulic data that is used for slowly releasing the engaged condition of the frictional element for engine brake in addition to a hydraulic data used for operation in the automatic shift mode. However, in this case, the amount of hydraulic data treated by the electronic control unit is increased which -brings about a higher cost of the control unit.

In a hydraulic control device in the automatic transmission of the latter Laid-open Application, there are arranged various frictional elements that are respectively used for different speeds. However, in this case, various data, such as data for obtaining hydraulic pressure gradient (viz., sweep down) used when the frictional element for engine brake is released and time-related data, have to be prepared and thus like in the measures of the former Laid-open Application, the amount of hydraulic data treated by the electronic control unit is increased.

Accordingly, it is an object of the present invention to provide an automatic transmission of a motor vehicle, which is free of the above-mentioned drawbacks.

According to the present invention, there is provided an automatic transmission of a motor vehicle, in which a first data section is provided that has a given data actually used when a given frictional element is operated under a manual shift mode for providing an engine brake, and a second data section is provided that is actually used when an automatic shift is carried out. A control unit is so configured that when, during a shift from a second speed stage to a first speed stage under the manual shift mode, a mode change from the manual shift mode to the automatic shift mode is instructed, releasing operation of the given frictional element is carried out by using the given data of the first dada section.

In accordance with a first aspect of the present invention, there is provided an automatic transmission of a motor vehicle, which comprises a shift mechanism including a frictional element that establishes and disestablishes an engine brake when engaged and-disengaged respectively, the shift mechanism having a first speed stage in which the frictional element is able to, be engaged and disengaged selectively and a second speed stage in which the frictional element is disengaged; and a control unit including a control section that controls the operation of the shift mechanism in accordance with data given thereto, a first data section having a first data that is used by the control section when a shift is carried out under a first shift mode between the first speed stage of the type that needs the engagement of the frictional element and the second speed stage and a second data section having a second data that lacks the first data and is used by the control section when a shift is carried out under a second shift mode between the first speed stage of the type that needs the disengagement of the frictional element and the second speed stage, the control section being configured to carry out: upon receiving an instruction to change the mode from the first shift mode to the second shift mode during a shift from the second speed stage to the first speed stage under the first shift mode and receiving an instruction to carry out a shift to the second speed stage, finishing the shift to the first speed stage under the first shift mode; and finishing the shift to the first speed stage under the first shift mode; and carrying out a shift under the second shift mode from the first speed stage to the second speed stage with reference to the first data section.

In accordance with a second aspect of the present invention, there is provided an automatic transmission of a motor vehicle, which comprises a shift mechanism including a frictional element that establishes and disestablishes an engine brake when engaged and disengaged respectively, the shift mechanism having a first speed stage in which the frictional element is able to be engaged and disengaged selectively and a second speed stage in which the friction element is disengaged; and a control section that controls a switching between the engagement of the frictional element and disengagement of the same and a switching between the first speed stage and the second speed stage; a first data section having a data for controlling operation of the frictional element, the first data section being used by the control section to provide a first shift mode that controls a shift between the first speed stage of the type that needs the engagement of the frictional element and the second speed stage; a second data section lacking the data for controlling operation of the frictional element, the second data section being used by the control section to provide a second shift mode that controls a shift between the first speed stage of the type that needs the disengagement of the frictional element and the second speed stage, wherein when, during a shift from the second speed stage to the first speed stage under the first shift mode, a mode change instruction to the second shift mode is produced and a shift to the second speed stage is needed, the control section finishes the shift to the first speed stage under the first shift mode and then carries out a control of the shift from the first speed stage to the second speed stage under the second shift mode with reference to the data of the first data section.

BRIEF DESCRIPTION OF THE DRAWINGS

Other objects and advantages of the present invention will become apparent from the following description when taken in conjunction with the accompanying drawings, in which:

FIG. 2 is a table showing ON/OFF condition of six frictional elements of the transmission with respect to the operative condition that the transmission can take;

FIG. 4 is a block diagram of an automatic transmission control unit employed in the present invention;

FIG. 5 is a flowcharts showing programmed operation steps executed in a case wherein under a manual shift mode an instruction is issued for changing the mode to an automatic shift mode; and FIG. 6 is a time-chart showing hydraulic characteristics of a 2-6 brake (2-6/B) and a low and reverse brake (L&R/B), and modes, ranges and gear ratios of the transmission with respect to an elapsed time.

DETAILED DESCRIPTION OF THE INVENTION

Figure 1:
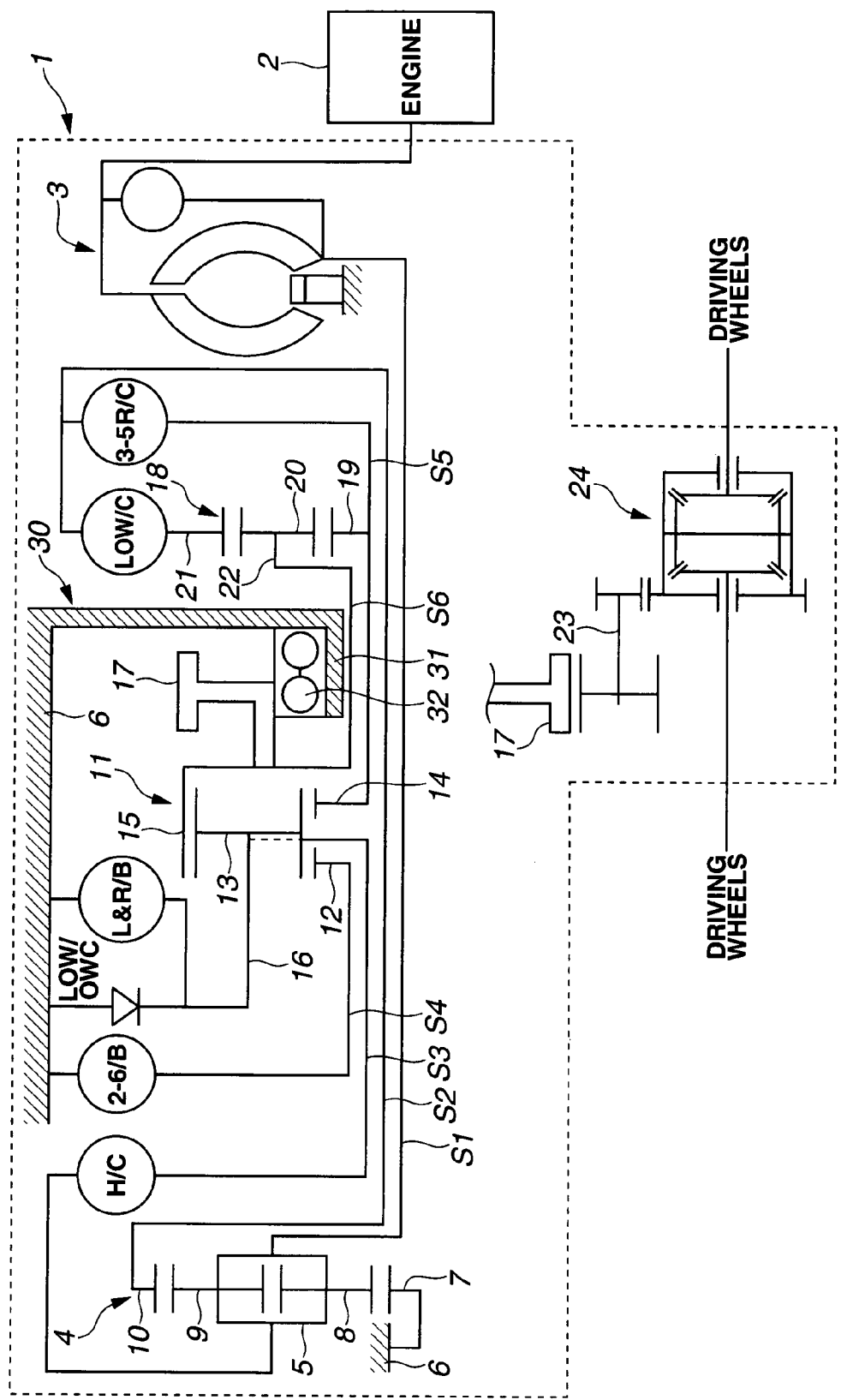
FIG. 1 is a schematic diagram of an automatic transmission that establishes six forward speeds and one reverse, to which the present invention is practically applied.

Referring to FIG. 1 of the drawings, there is schematically shown an automatic transmission 1 of a six forward speeds and one reverse type, to which the present invention is practically applied.

Denoted by numeral 2 is an engine such as internal combustion engine or the like, and denoted by numeral 3 is a torque converter that has an input part to which a torque (or output) of the engine 1 is applied. An output part of the torque converter 3 is connected to one end of a first rotation shaft (S1) to rotate therewith. The other end of the rotation shaft 3 is connected to a pinion carrier 5 of a double pinion type planetary gear unit 4, as shown.

The double pinion type planetary gear unit 4 comprises a sun gear 7 fixed to a transmission case 6, inside pinion gears 8 meshed with the sun gear 7, outside pinion gears 9 meshed with the inside pinion hears 8, a ring gear 10 arranged concentric with the sun gear 7 and meshed with the outside pinion gears 9 and the above-mentioned pinion carrier 5 that holds both the inside and outside pinion gears 8 and 9.

As shown, the ring gear 10 is connected to a second rotation shaft (S2) that extends toward the engine 2 through an inside of an after-mentioned output gear 17. The second rotation shaft (S2) is a hollow shaft that rotatably receives therein the first rotation shaft S1.

The pinion carrier 5 is connected through a high clutch (H/C) to a third rotation shaft (S3) that extends toward the engine 2. The third rotation shaft (S3) is a hollow shaft that rotatably receives therein the second rotation shaft (S2).

The third rotation shaft (S3) is connected at its leading end to a pinion carrier 16 that holds pinion gears 13 of a first single pinion type planetary gear unit 11. The pinion carrier 16 connected to the transmission case 6 through a low and reverse brake (L&R/B) and a low one-way clutch (LOW/OWC) that are arranged in parallel with each other. As will become clarified as the description proceeds, the low and reverse brake (L&R/B) severs as an friction element for engine brake.

With such parallelly arranged elements (L&R/B) and (LOW/OWC), the pinion carrier 16 can take either a fixed condition or a rotational condition relative to the transmission case 6 and the rotation of the pinion carrier 16 is permitted in only one direction.

The first single pinion type planetary gear unit 11 comprises coaxially arranged first and second sun gears 12 and 14, the pinion gears 13 meshed with both the first and second sun gears 12 and 14, the pinion carrier 16 holding the pinion gears 13 and a ring gear 15 arranged concentric with the sun gears 12 and 14 and meshed with the pinion gears 13.

The first sun gear 12 is connected to one end of a fourth rotation shaft (S4) of which other end is connected through a 2-6 brake (2-6/B) to the transmission case 6. The fourth rotation shaft (S4) is hollow to rotatably receive therein the third rotation shaft (S3).

With provision of such 2-6 brake (2-6/B), the fourth rotation shaft (S4) can take either a fixed condition or a rotational condition relative to the transmission case 6.

The second sun gear 14 is connected to one end of a fifth rotation shaft (S5) that is hollow to rotatably receive therein the second rotation shaft (S2). The other end of the fifth rotation shaft (S5) is connected through a 3-5 reverse clutch (3-5R/C) to the second rotation shaft (S2) and connected through the 3-5 reverse clutch (3-5R/C) and a low clutch (L/C) to a ring gear 21 of a second single pinion type planetary gear unit 18.

As shown, the second single pinion type planetary gear unit 18 is arranged about the fifth rotation shaft (S5) between the output gear 17 and the 3-5 reverse clutch (3-5R/C).

The second single pinion type planetary gear unit 18 comprises a sun gear 19 secured to the fifth rotation shaft (S5), pinion gears 20 meshed with the sun gear 19, a pinion carrier 22 holding the pinion gears 20 and the ring gear 21 meshed with the pinion gears 20.

The pinion carrier 22 is connected to one end of a sixth rotation shaft (S6) that is hollow to rotatably receive therein the fifth rotation shaft (S5). As shown, the sixth rotation shaft (S6) passes in and through the output gear 17 and is connected at the other end thereof to the ring gear 15 of the first single pinion type planetary gear unit 11.

As shown, between the first and second single pinion type planetary gear units 11 and 18, there is arranged a bearing support structure 30 that is a partition member integral with the transmission case 6. As shown, the bearing support structure 30 has at a radially inward end thereof an annular bearing support portion 31.

On the annular bearing support portion 31, there is mounted an annular bearing 32 of which inner race is tightly put on the support portion 31 and of which outer race is secured to the output gear 17 that is connected to the ring gear 15 of the first single pinion type planetary gear unit 11.

As is understood from the drawing (FIG. 1), within the bearing support portion 31, a multilayered cylindrical shaft structure is provided by the first, second, fifth and sixth rotation shafts S1, S2, S5 and S6 which are arranged concentrically.

In D-range, the automatic transmission 1 having the above-mentioned construction automatically carries out a "six forward speeds shift" in accordance with both a shift schedule (viz., shift map) and an operating point determined by a vehicle speed and a throttle open degree.

Upon select operation from D-range position to R-range position, a shift control for the reverse is carried out. In this case, as is seen from the table of FIG. 2, due to ON/OFF (viz., engaged/disengaged) operation of the high clutch (H/C), 2-6 brake (2-6/B), low and reverse brake (L & R/B), low one-way clutch (LOW/OWC), low clutch (LOW/C) and 3-5 reverse clutch (3-5R/C), the output of the engine 2 is handled by the transmission 1 to have a desired rotation speed and the rotation thus having the desired speed is transmitted to drive wheels (not shown) of the vehicle from the output gear 17 through a countershaft 23 and a differential gear 24.

ON/OFF condition of the various frictional elements of the transmission 1 at each speed is depicted by the table of FIG. 2. In this table, circle means ON (or engaged) condition of the frictional element and no circle means OFF (or disengaged) condition of the element. Hatched circle means a mechanical engagement of the element that takes place when the road wheels are driven by the engine. In other words, the mechanical engagement of the element doesn't participate in transmitting the rotation from the engine 2 to the road wheels. Actually, due to this mechanical engagement, only regulated rotation of the element is allowed.

Furthermore, circle having mark "x" therein means ON (or engaged) condition of the element at the time of engine braking. As will be described in detail hereinafter, such ON condition of the element takes place only under manual shift mode wherein the driver can change the speed manually. In other words, such ON condition of the element does not take place under automatic shift mode.

As will be clarified as the description proceeds, in the present invention, the first speed (1ST) is provided in a first speed stage and the second speed to sixth speed (2ND-6TH) are each provided in a second speed stage.

As is seen from the table of FIG. 2, for achieving the first speed (1ST), engagement of the low clutch (LOW/C) and engagement of either one of the low and reverse brake (L&R/B) and the low one-way clutch (LOW/OWC) are needed. As is seen from FIG. 1, in case of the D-range position, the rotation of which speed has reduced during a transmission from the first rotation shaft (S1) through the double pinion type planetary gear unit 4 is led to the second rotation shaft (S2), and the rotation of this shaft (S2) is led to the pinion carrier 22 through the low clutch (LOW/C) and the ring gear 21 of the second single pinion type planetary gear unit 18. The rotation thus inputted to the pinion carrier 22 is transmitted through the sixth rotation shaft S6 to the ring gear 15 of the first single pinion type planetary gear unit 11. However, in this case, due to ON (or engaged) condition of the low one-way clutch (LOW/OWC), the rotation is forced to receive a counterforce from the pinion carrier 16 fixed to the transmission case 6, and thus, the ring gear 15 is forced to rotate at a reduced speed, resulting in that the output gear 17 outputs a torque of the maximum speed reduction ratio.

Under engine braking, the low and reverse brake (L&R/B) receives the counterforce in place of the low one-way clutch (LOW/OWC) that turns idly.

For achieving the second speed (2ND), engagement of the low clutch (LOW/C) and engagement of the 2-6 brake (2-6/B) are needed. Under this speed, the rotation of which speed has reduced during a transmission from the first rotation shaft (S1) through the double pinion type planetary gear unit 4 is led to the second rotation shaft (S2), and the rotation of this shaft (S2) is led to the pinion carrier 22 through the low clutch (LOW/C) and the ring gear 22 of the second single pinion type planetary gear unit 18.

While at the second speed (2ND), due to ON (or engaged) condition of the 2-6 brake (2-6/B), both the first sun gear 12 and the pinion gears 13 are fixed to the transmission case 6. Furthermore, due to a meshed engagement between the pinion gears 13 and the second sun gear 14, the fifth rotation shaft S5 connected to the second sun gear 14 is fixed to the transmission case 6.

For achieving the third speed (3RD), engagement of the low clutch (LOW/C) and engagement of the 3-5 reverse clutch (3-5R/C) are needed. For the fourth speed (4TH), engagement of the low clutch (LOW/C) and engagement of the high clutch (H/C) are needed. Furthermore, for the fifth speed (5TH), engagement of the 3-5 reverse clutch (3-5R/C) and engagement of high clutch (H/C) are needed.

For achieving the sixth speed (6TH), engagement of the high clutch (H/C) and engagement of the 2-6 brake (2-6/B) are needed.

In the sixth speed (6TH), due to the engagement of the 206 brake (2-6/B), the fifth rotation speed S5 becomes fixed like in case of the above-mentioned second speed (2ND).

For achieving the reverse (REV), engagement of the 3-5 reverse clutch (3-5R/C) and engagement of low and reverse brake (L&R/B) are needed.

In the following, a hydraulic circuit and an electronic control system that automatically establish the above-mentioned speeds and reverse will be described with the aid of FIG. 3.

As is seen from the drawing, the low clutch (LOW/C) has an engaging piston chamber 101 and the high clutch (H/C) has an engaging piston chamber 102. Like this, the 2-6 brake (2-6/B), the 3-5 reverse clutch (3-5R/C) and the low and reverse brake (L&R/B) have respective piston chambers 103, 104 and 105.

These low clutch (LOW/C), high clutch (H/C), 2-6 brake (2-6/B), 3-5 reverse clutch (3-5R/C) and low and reverse brake (L&R/B) show their ON (or engaged) conditions when the respective piston chambers 101 to 105 are fed with a line pressure (PL) and D-range pressure (D-pressure) or R-range pressure (R-pressure). When the engaging pressure is relieved from the piston chambers 101 to 105, such frictional elements show their OFF (or disengaged) conditions.

It is to be noted that the D-range pressure (D-pressure) is a line pressure PL through a manual valve 116 and produced only when the D-range is selected.

It is further to be noted that the R-range pressure (R-pressure) is also a line pressure PL through the manual valve 118 and produced only when the R-range is selected. That is, when a shift lever (not shown) actuating the manual valve 116 takes a position other than the R-range, the corresponding fluid line is connected to a drain port and thus the R-range pressure is not produced.

Figure 3:
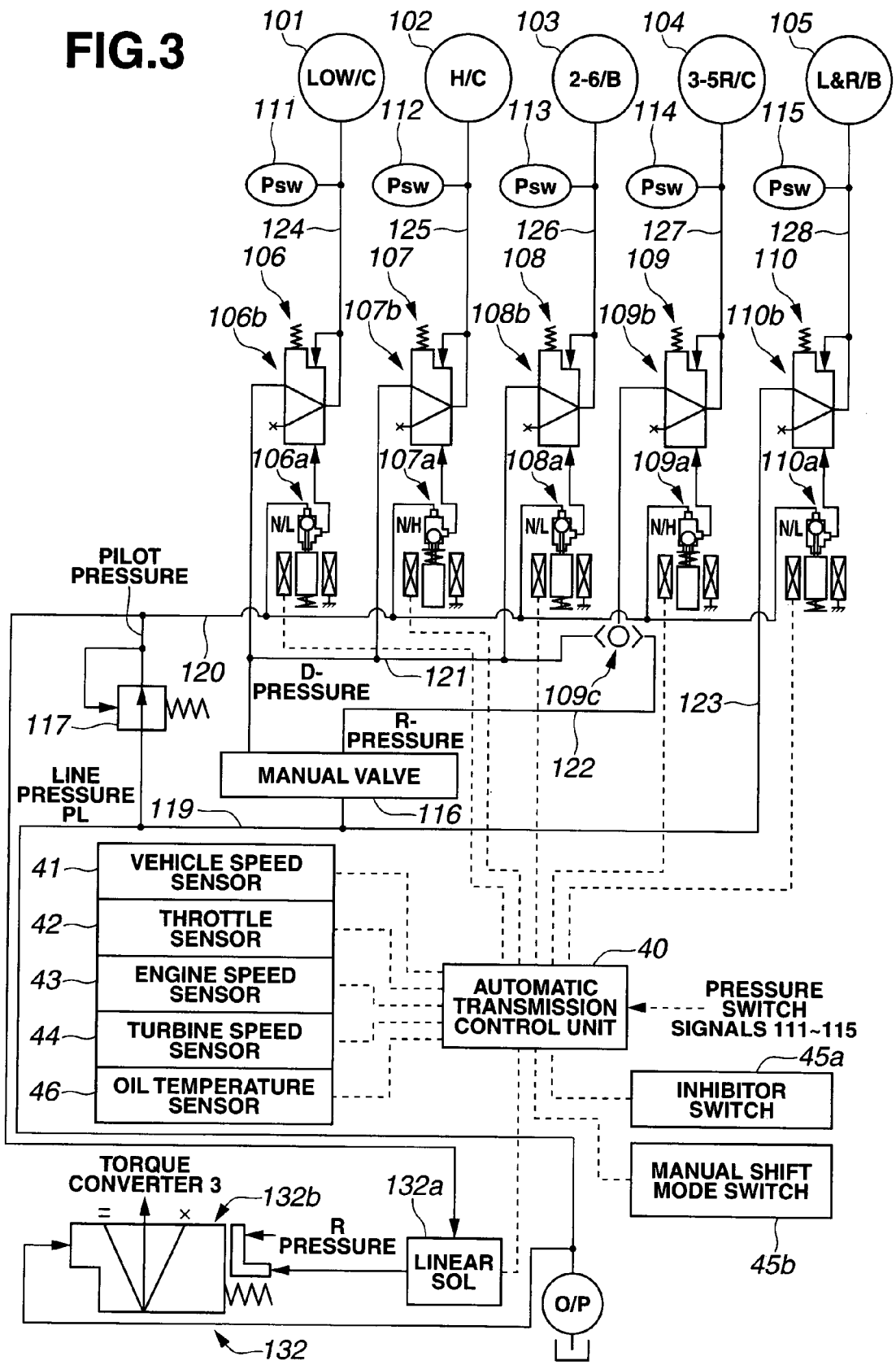
FIG. 3 is a block diagram showing a hydraulic circuit and an electronic control system, that are employed in the automatic transmission of the present invention.

As shown in FIG. 3, the hydraulic system comprises a first hydraulic pressure control valve 106 that controls the engaging pressure (viz., low clutch pressure) for the low clutch (LOW/C), a second hydraulic pressure control valve 107 that controls the engaging pressure (viz., high clutch pressure) for the high clutch (H/C), a third hydraulic pressure control valve 108 that controls the engaging pressure (viz., 2-6 brake pressure) for the 2-6 brake (2-6/B), a fourth hydraulic pressure control valve 109 that controls the engaging pressure (viz., 3-5 reverse clutch pressure) for the 3-5 reverse clutch (3-5R/C), a fifth hydraulic pressure control valve 110 that controls the engaging pressure (viz., low and reverse brake pressure) for the low and reverse brake (L&R/B) and a line pressure control valve 132 that controls the line pressure PL.

The first hydraulic pressure control valve 106 comprises a first duty solenoid 106a that produces a solenoid pressure by using a pilot pressure as a base pressure and a first pressure regulating valve 106b that regulates the D-range pressure to the low clutch pressure by using the solenoid pressure from the first duty solenoid 106a as an operating signal pressure and causes the low clutch pressure to be applied thereto as a feedback pressure.

The first duty solenoid 106a is a solenoid controlled based on a duty ratio. More specifically, when the solenoid is in OFF condition, the low clutch pressure shows 0 (zero), and when the solenoid is in OB condition, the low clutch pressure increases as the duty ratio increases.

The second hydraulic pressure control valve 107 comprises a second duty solenoid 107a that produces a solenoid pressure by using a pilot pressure as a base pressure and a second pressure regulating valve 107b that regulates the D-range pressure to the high clutch pressure by using the solenoid pressure from the second duty solenoid 107a as an operating signal pressure and causes the high clutch pressure to be applied thereto as a feedback pressure.

When the solenoid is in 100% ON duty ratio, the second duty solenoid 107a causes the high clutch pressure to be 0 (zero), the high clutch pressure being increased as the ON duty ratio reduces, and the high clutch pressure showing the maximum value when the solenoid is in OFF condition.

The third hydraulic pressure control valve 108 comprises a third duty solenoid 108a that produces a solenoid pressure by using a pilot pressure as a base pressure and a third pressure regulating valve 108b that regulates the D-range pressure to the 2-6 brake pressure by using the solenoid pressure from the third duty solenoid 108a as an operating signal pressure and causes the 2-6 brake pressure to be applied thereto as a feedback pressure.

When the solenoid is in OFF condition, the third duty solenoid 108a causes the 2-6 brake pressure to be 0 (zero), and when the solenoid is in ON condition, the solenoid 108a causes the 2-6 brake pressure to increase as the ON duty ratio increases.

The fourth hydraulic pressure control valve 109 comprises a fourth duty solenoid 109a that produces a solenoid pressure by using a pilot pressure as a base pressure and a fourth pressure regulating valve 109b.

When the D-range is selected, the fourth pressure regulating valve 109b regulates the D-range pressure to the 3-5 reverse clutch pressure by using the solenoid pressure from the fourth duty solenoid 109a as an operating signal pressure and causes the 3-5 reverse clutch pressure to be applied thereto as a feedback pressure.

When the R-range is selected, the R-range pressure is regulated to the 3-5 reverse clutch pressure.

When the solenoid is in 100% ON duty ratio, the fourth duty solenoid 109a causes the 3-5 reverse clutch pressure to be 0 (zero), the 3-5 reverse clutch pressure being increased as the ON duty ratio reduces, and the 3-5 reverse clutch pressure showing the maximum value when the solenoid is in OFF condition.

As is shown in FIG. 3, on the fluid passage led to the fourth hydraulic pressure control valve 109, there is arranged a shuttle ball 109c of a two-way switching valve. The shuttle ball 109c is arranged to feed the fourth hydraulic pressure control valve 109 with only one of the D-range pressure and the R-range pressure.

The fifth hydraulic pressure control valve 110 comprises a fifth duty solenoid 110a that produces a solenoid pressure by using a pilot pressure as a base pressure and a fifth pressure regulating valve 110b that regulates the line pressure PL to the low and reverse brake pressure by using the solenoid pressure from the fifth duty solenoid 110a as an operating signal pressure and causes the low and reverse brake pressure to be applied thereto as a feedback pressure.

When the solenoid is in OFF condition, the fifth duty solenoid 110a causes the low and reverse brake pressure to be 0 (zero), and when the solenoid is in ON condition, the low and reverse brake pressure is increased as the ON duty ratio increases.

The line pressure control valve 132 comprises a linear solenoid (LINEAR SOL) that is a three-way proportional electromagnetic valve to produce a solenoid pressure by using a pilot pressure as a base pressure and a line pressure regulating valve 132b that regulates a discharge pressure from an oil pump (O/P) to the line pressure PL by using the solenoid pressure from the linear solenoid 132a as an operating signal pressure and causes the line pressure PL to be applied thereto as a feedback pressure.

The linear solenoid 132a causes the line pressure PL to have the maximum value when it is OFF condition, and causes the line pressure PL to lower as the current increases.

The fluid drained from the line pressure regulating valve 132 is led to the torque converter 3 as a first drain and to an inlet port of the oil pump (O/P) as a second drain. The pressure of fluid led to the torque converter 3 is called as converter pressure.

As is seen from FIG. 3, a low clutch pressure passage 124 is connected to the engaging piston chamber 101 of the low clutch (LOW/C), a high clutch pressure passage 125 is connected to the engaging piston chamber 102 of the high clutch (H/C), a 2-6 brake pressure passage 126 is connected to the engaging piston chamber 103 of the 2-6 brake (2-6/B), a 3-5 reverse clutch pressure passage 127 is connected to the engaging piston chamber 104 of the 3-5 reverse clutch (3-5R/C) and a low and reverse brake pressure passage 128 is connected to the engaging piston chamber 105 of the low and reverse brake (L&R/B).

To these five pressure passages 124 to 128, there are respectively connected first to fifth pressure switches (Psw) 111 to 115 each detecting ON/OFF condition of the engaging pressure. That is, when detecting the engaging pressure, the switch (Psw) issues ON signal, while when detecting no engaging pressure, the switch (Psw) issues OFF signal.

The manual valve 116 is constructed to produce both the D-range pressure and R-range pressure from the line pressure led thereto from the oil pump (O/P) through a line pressure passage 119. The D-range pressure and R-range pressure are led to the above-mentioned hydraulic pressure control valves 106 to 109 through D-range pressure passage 121 and R-range pressure passage 122 in such a manner as shown.

The line pressure passage 119 is provided with a pilot valve 117 and the pilot pressure produced from the line pressure is led through a pilot pressure passage 120 to the hydraulic pressure valves 106 to 110 and the linear solenoid 132a, as shown.

An electronic shift control system is provided which generally comprises an A/T (viz., automatic transmission) control unit 40, a vehicle speed sensor 41, a throttle sensor 42 that detects a throttle open degree of the engine, an engine speed sensor 43, a turbine speed sensor 44 that detects a rotation speed of a turbine of the torque converter 3, an inhibitor switch 45a that detects the position of a shift lever manually controlled by the driver, a manual shift mode switch 45b that becomes ON when a manual shift mode is selected and an oil temperature sensor 46 that senses the temperature of oil in the transmission.

To the A/T control unit 40, there are fed various information signals from the pressure switches 111 to 115 and sensors (and switches) 41 to 46. In the unit 40, based on such information signals and previously set shift and fuel safe control regulations, an arithmetic processing is carried out, so that solenoid drive signals produced based on the results of the arithmetic processing are fed to the first, second, third, fourth and fifth duty solenoids 106a, 107a, 108a, 109a and 110a and to the linear solenoid 132a.

In the following, the speed control will be described with reference to FIG. 4 that schematically shows the construction of the A/T control unit 40.

To an input side of the A/T control unit 40, there are connected the above-mentioned sensors and switches 41 to 46 and 111 to 115, and to an output side of the unit 40, there are connected the above-mentioned duty solenoids 106a to 110a and linear solenoid 132a.

The A/T control unit 40 is a computer that generally includes a CPU (central processing unit), a RAM (random access memory), a ROM (read only memory) and input and output interfaces. More specifically, the control unit 40 comprises a shift control section 400 that carries out various kinds of the arithmetic processing for the shift control, a control data section 401 (viz., second operating hydraulic pressure data section) that is actually used when the transmission 1 is in an automatic shift mode (viz., second shift mode) and a control data section 402 (viz., first operating hydraulic pressure data section) that is actually used when the transmission 1 is in a manual shift mode (viz., first shift mode).

It is to be noted that the automatic transmission 1 is equipped with known means with which the automatic and manual shift modes are changeable upon manipulation of the shift lever by the driver.

That is, upon shifting of the shift lever, a corresponding mode change signal is fed to the A/T control unit 40 through the manual shift mode switch 45b.

As is seen from FIG. 2, only when, under the manual shift mode, the transmission 1 takes the first speed (1ST), the low and reverse brake (L&R/B) is engaged.

In the automatic shift mode, based on the information signals from the sensors and switches, the shift control section 400 determines a target speed with reference to the data of the control data section 401 for the automatic shift mode, and outputs corresponding solenoid actuating signals to the duty solenoids 106a to 110a and linear solenoid 132a for the engagement/disengagement of the frictional elements for achieving the target speed.

The control data section 401 for the automatic shift mode comprises shift maps for determination of the target speed and control data indicating timing of the engagement/disengagement of the frictional elements for each speed.

However, the control data section 401 is not provided with a hydraulic pressure data for the low and reverse brake (L&R/B) that is used for engine brake.

In the manual shift mode, for achieving a speed manually selected by the driver, the shift control section 400 outputs corresponding solenoid actuating signals to the duty solenoids 106a to 110a and linear solenoid 132a with reference to not only the data of the control data section 402 for the manual shift mode but also the information signals from the sensors and switches.

As is described hereinabove, by changing the reference data (viz., data in the section 401 and data in the section 402), the shift control section 400 carries out the shift control between the automatic and manual shift modes.

The control data section 402 for the manual shift mode comprises a control data that indicating timing of the engagement/disengagement of the frictional elements for each speed.

The control data section 402 is provided with the hydraulic pressure data for the low and reverse brake (L&R/B) that is used for engine brake.

In the following, a control process will be described with the aid of the flowchart of FIG. 5 in a case wherein, under the manual shift mode, a mode change instruction to the automatic shift mode is applied to the shift control section 400 of the A/T control unit 40.

As shown by the flowchart of FIG. 5, at step S200, judgment is carried out as to whether or not it is necessary to carry out a shift upon receiving such mode change instruction.

Judgment as to whether such mode change instruction has happened or not is carried out by processing the information signal from the manual shift mode switch 45b, and judgment as to whether the shift is necessary or not upon receiving such mode change instruction is carried out by comparing an existing speed of the transmission 1 with a target speed (viz., subsequent speed) of the transmission 1 that is calculated based on the data of the control data section 401 for the automatic shift mode and the information signals from the sensors and switches.

If YES at step S200, that is, when it is judged that such shift is necessary, the operation flow goes to step S201. For example, such YES takes place in case wherein upon switching from the manual shift mode (for example, under first speed (1ST) or third speed (3RD) of the mode) to the automatic shift mode, a shift is necessary. If NO at step S200, the same step is repeated keeping the existing speed of the transmission 1.

At step S201, judgment is carried out as to whether the transmission 1 is under a condition to inhibit a re-shift thereof or not. This condition (viz., re-shift inhibiting condition) is a condition wherein a shift movement is being carried out in the transmission 1, that is, a gear ratio is being changed. It is to be noted that even under a shift control, a condition, such as a condition just after starting of the shift control, wherein the gear ratio is not changed yet is judged as a condition to permit the re-shift.

The automatic transmission 1 is of a type that does not start a subsequent shift control until completion of a currently proceeding shift if the transmission 1 is under the re-shift inhibiting condition.

If YES at step S201, that is, when it is judged that the transmission 1 is under the re-shift inhibiting condition, the operation flow goes to step S202. While, if NO, that is, when it is judged that the transmission 1 is not under such inhibiting condition, the operation flow goes to step S211 to cause the transmission 1 to operate under the ordinary automatic shift mode.

If it is judged that the transmission 1 is not under the re-shift inhibiting condition and the transmission 1 is under a shift control, the shift control is stopped and a subsequent shift is carried out under the ordinary automatic shift mode.

At step S202, judgment is carried out as to whether the frictional element (namely, low and reverse brake (L&R/B)) for engine brake is kept engaged or not.

As is shown in the table of FIG. 2, the frictional element for the engine brake discussed in step S202 is the low and reverse brake (L&R/B). Only when the transmission 1 assumes the first speed (1ST) under the manual shift mode, the low and reverse brake (L&R/B) is engaged. Thus, in other words, at step S202, judgment is carried out as to whether the existing speed of the transmission 1 is the first speed (1ST) under the manual shift mode or not.

If YES, that is, when the existing speed is the first speed (1ST) under the manual shift mode, the operation flow goes to step S203 where a flag for indicating the manual shift mode is turned on.

While, if NO at step S202, that is, when for example, the transmission 1 assumes she second or third speed (2ND or 3RD) under the manual shift mode, the operation flow goes to step S204.

At step S204, the shift control that is kept carried out based on the data of the control data section 402 for the manual shift mode is maintained. Then, at step S205, judgment is carried out as to whether the current shift has been ended or not. If NO, the operation flow goes back to step S204 and repeats the operations of the steps S204 and S205 until the completion of the current shift.

If YES at step S205, that is, when it is judged that the current shift has been ended, the operation flow goes to step S206. In this step, the shift information is rewritten for a subsequent shift control. More specifically, information on the current speed (CurGP) is rewritten or replaced with information on the subsequent speed (NexGP).

It is to be noted that the subsequent speed (NexGP) is the is speed that has been judged as being necessary at step S200. That is, based on the written information of the shift, the shift control section 400 of the A/T control unit 40 carries out a shift process overwriting the subsequent speed information on the current speed information.

Then at step S207, judgment is carried out as to whether the flag for indicating the manual shift mode is kept ON or not.

If YES at step S207, that is, when the flag is kept ON, the operation flow goes to step S208. If not, the operation flow goes to step S211.

At step S208, a shift control is carried out with usage of the data of the control data section 402 for the manual shift mode in such a manner as to take the subsequent speed on the automatic shift mode that has been judged as being necessary at step S200.

At this step S208, the flag for indicating the manual shift mode is kept ON and thus the current speed of the transmission 1 is the first speed (1ST) under the manual shift mode, and thus the low and reverse brake (L&R/B) is kept engaged.

The data of the control data section 402 for the manual shift mode include control data for an up-shift from the first speed (1ST) to the second speed (2ND) or to the third speed (3RD). That is, the control data section 402 has a hydraulic pressure data that is used when the low and reverse brake (L&R/B) is released for establishing an up-shift from the first speed (1ST) to the other speed.

Accordingly, when the transmission 1 is subjected to an up-shift from the first speed (1ST) under the manual shift mode to a higher speed, the data of the control data section 402 for the manual shift mode can be suitably used for the release operation of the low and reverse brake (L&R/B). That is, actual usage of such data brings about a smoothed release operation of the brake (L&R/B) and thus the shift is smoothly carried out without shock.

If NO at step S207, that is, when the flag is not ON, the operation flow goes to step S211. At this step, a shift control is carried out with usage of the data of the control data section 401 for the automatic shift mode in such a manner as to take the subsequent speed that has been judged as being necessary at step S200. Then, the operation flow goes to step S209.

At step S209, judgment is carried out as to whether the shift control has been ended or not. If YES, the operation flow goes to step S210. If NO, the operation flow goes back and repeats the operation until the completion of the shift control.

At step S210, the flag for indicating the manual shift mode is turned OFF.

Then, at step S211, the shift control under the automatic shift mode is carried out using the data of the control data section 401 for the automatic shift mode.

In the following, the detail of the process for releasing the low and reverse brake (L&R/B) will be described with the aid of FIG. 6.

The description will be directed to a case wherein, at step S200 of the flowchart of FIG. 5, it is judged that during an actual shift under the manual shift mode from the second speed (M2) to the first speed (M1), a mode change instruction to an automatic shift mode is produced and the second speed (2ND) is calculated as a subsequent speed.

FIG. 6 is a time-chart that shows hydraulic characteristics of the 2-6 brake (2-6/B) and the low and reverse brake (L&R/B) with respect to an elapsed time.

At time t3, a driver moves a shift lever from a position indicating the first speed (M1-range) under the manual shift mode to a position indicating the automatic shift mode (D-range). Upon this, it is regarded that there is an instruction for changing the mode from the manual shift mode to the automatic shift mode.

Before time to, it is regarded that the second speed (2ND) under the manual shift mode is kept.

When at time to an instruction takes place to change the speed to the first speed (1ST) under the manual shift mode due to movement of the shift lever handled by the driver, the shift control section 400 of the A/T control unit 40 rewrites a subsequent speed (NxtGP) from 2 (second speed) to 1 (first speed). At the same time, with usage of the data of the control data section 402 for the manual shift mode, the section 400 functions to gradually lower the engaging pressure of the 2-6 brake (2-6/B) and finally release the brake (2-6/B), and gradually increase the operating pressure of the low and reverse brake (L&R/B) for engaging the brake (L&R/B).

It is now to be noted that the low and reverse brake (L&R/B) is provided with a return spring by which a piston is returned to a given position when the drive and driven frictional plates are in their disengaged condition. For the period from time to to time t2, the stroke of the return spring is shortened, and for the period from t2 to time t4, the hydraulic pressure is increased at a given gradient (or slope) to induce engagement of the low and reverse brake (L&R/B).

When, during increase of the hydraulic pressure of the low s and reverse brake (L&R/B) at the given gradient, a mode change instruction appears at time t3 due to manipulation of the shift lever by the driver, YES answer is produced at step S200 of the flowchart of FIG. 5. However, the shift operation from the second speed (2ND) to the first speed (1ST) under the manual shift mode until completion of the existing shift operation. This corresponds the operations of steps S204 and S205 of FIG. 5.

Accordingly, as is seen from FIG. 6, from time t4, due to work of the shift control section 400, the increasing speed of the hydraulic pressure for the low and reverse brake (L&R/B) is kept somewhat reduced until establishment of the target gear ratio (viz., first speed (1ST)). If desired, after time t4, the hydraulic pressure of the low and reverse brake (L&R/B) may be kept at a constant level.

Once the first speed (1ST) is established and thus the shift is ended, the hydraulic pressure of the low and reverse brake (L&R/B) is increased to the maximum level at time t5. With this action, undesired slippage of the brake (L&R/B) is suppressed.

Because of ending of the shift, the current speed (CurGP) is rewritten from 2 (2ND) to 1 (1ST) and the subsequent speed (NexGP) is rewritten from 1 (1ST) to 2 (2ND). This action corresponds to the operation of step S206 of the flowchart of FIG. 5.

Thus, at time t5, switching is carried out from the manual shift mode to the automatic shift mode. Under this condition, the low and reverse brake (L&R/B) is kept engaged and the flag for indicating the manual shift mode is kept ON (see step S207 of FIG. 5).

Accordingly, from time t6, a shift operation from first speed (M1) to the second speed (M2) is carried out while using the data of the control data section 402 for the manual shift mode (see S208 of FIG. 5).

Thus, from time t6, the hydraulic pressure for the 2-6 brake (2-6/B) is gradually increased for the engagement thereof and at the same time the hydraulic pressure for the low and reverse brake (L&R/B) is gradually reduced for the disengagement thereof. As is seen from the time-chart of FIG. 6, at time t6, due to work of the shift control section 400, the maximum pressure for tightly engaging the low and reverse brake (L&R/B) is sharply lowered and thereafter gradually lowered.

At time t7, the shift is ended. When thus it is judged that shift control is ended at step S209 of the flowchart of FIG. 5, the shift control section 400 starts the normal automatic shift control using the data of the control data section 401 for the automatic shift mode.

Now, consideration will be directed to a case wherein after time t5, the disengagement of the low and reverse brake (L&R/B) is carried out using the data 401 for the automatic shift mode without usage of the data 402 for the manual shift mode.

It is to be noted that by its inherency, the control data section 401 for the automatic shift mode is constructed without considering the engagement/disengagement operation of the low and reverse brake (L&R/B). Thus, a gradual disengaging operation of the brake (L&R/B) is not achieved by using such control data section 401.

Accordingly, in case wherein the low and reverse brake (L&R/B) has been kept engaged, a mode change to the automatic shift mode upon completion of the shift under the manual shift mode instantly induces a sharp reduction of the hydraulic pressure of the brake (L&R/B) as is indicated by a phantom line "P" of FIG. 6. That is, as shown, upon such mode change, the hydraulic pressure of the brake (L&R/B) is instantly lowered to 0 (zero). On course, in such case, the disengagement of the brake (L&R/B) instantly takes place, which causes undesirable shift shock and/or interruption of engine brake feeling.

However, in accordance with the present invention, just after a mode change to the automatic shift mode, the engaged condition of the low and reverse brake (L&R/B) is slowly released with reference to the data 402 for the manual shift mode in case of necessity of the disengagement of the brake (L&R/B). Accordingly, the above-mentioned undesirable shift shock and interruption of engine brake feeling are suppressed or at least minimized.

In the exemplified time-chart of FIG. 6, the gradual releasing of the low and reverse brake (L&R/B) is carried out by using the control data 402 for a switch from the first speed (1ST) to the second speed (2ND) of the manual shift mode. However, if desired, such gradual releasing of the brake (L&R/B) may be carried out by using the control data 402 for a switch from the first speed (1ST) to another higher speed, for example, third or fourth speed (3RD or 4TH).

As is described hereinabove, in accordance with the present invention, the following advantageous operation is carried out by the transmission 1.

That is, when, under a condition of the manual shift mode wherein the low and reverse brake (L&R/B) is about to be engaged for the first speed (1ST), a mode change instruction to the automatic shift mode is produced and a shift is required for establishing a certain speed that needs the disengagement (or replacement) of the brake (L&R/B), the following steps are carried out by the shift control section 400 of the A/T control unit 40.

That is, upon receiving such shift requirement, the shift to the first speed (1ST) under the manual shift mode is made and thereafter a shift to the second speed (or other higher speed) is carried out by actually using the data 402 for the manual shift mode. Accordingly, the engaged condition of the low and reverse brake (L&R/B) can be gradually released. That is, for example, for releasing the engaged condition of the brake (L&R/B), the hydraulic pressure thereof may be lowered at a given gradient in accordance with a torque.

Accordingly, in the present invention, upon switching from the manual shift mode to the automatic shift mode, undesired rapid release of the low and reverse brake (L&R/B) is not suppressed and thus undesirable shift shock and interruption of engine brake feeling are suppressed or at least minimized.

As is mentioned hereinabove, by its inherency, the control data section 401 for the automatic shift control is constructed without assuming operation on engine brake. Thus, the control data section 401 is not provided with a data that controls the engagement/disengagement of the low and reverse brake (L&R/B). In view of this, in the present invention, upon switching from the manual shift mode to the automatic shift mode, a shift that would take place under the automatic shift mode is allowed to practically use the data 402 for the manual shift mode for releasing the engaged condition of the low and reverse brake (L&R/B). Thus, there is no need of providing the control data section 401 for the automatic shift mode with a control data for gradually releasing the engaged condition of the low and reverse brake (L&R/B). Thus, increase of data capacity is suppressed in the invention.

In the foregoing, explanation on operation is directed to a case wherein during a shift from the second speed (2ND) to the first speed (1ST) under the manual shift mode, a mode change instruction to the automatic shift mode is produced and a shift to the second speed (2ND) starts. However, the present invention includes also a case wherein during a shift from the third speed (3RD) to the first speed (1ST) under the manual shift mode, a mode change instruction to the automatic shift mode is produced and a shift to the second speed (2ND) starts.

The entire contents of Japanese Patent Application 2006-149674 filed May 30, 2006 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automatic transmission of a motor vehicle, comprising:
   a shift mechanism including a frictional element that establishes and disestablishes an engine brake when engaged and disengaged respectively, the shift mechanism having a first speed stage in which the frictional element is able to be engaged and disengaged selectively and a second speed stage in which the frictional element is disengaged; and
   a control unit including a control section that controls the operation of the shift mechanism in accordance with data given thereto, a first data section having a first data that is used by the control section when a shift is carried out under a first shift mode between the first speed stage of the type that needs the engagement of the frictional element and the second speed stage and a second data section having a second data that lacks the first data and is used by the control section when a shift is carried out under a second shift mode between the first speed stage of the type that needs the disengagement of the frictional element and the second speed stage,
   the control section being configured to carry out:
   upon receiving an instruction to change the mode from the first shift mode to the second shift mode during a shift from the second speed stage to the first speed stage under the first shift mode and receiving an instruction to carry out a shift to the second speed stage, finishing the shift to the first speed stage under the first shift mode; and
   carrying out a shift under the second shift mode from the first speed stage to the second speed stage with reference to the first data section.

2. An automatic transmission of a motor vehicle as claimed in claim 1, in which the first shift mode is a manual shift mode wherein the shift of the transmission is carried out manually by a driver and the second shift mode is an automatic shift mode wherein the shift of the transmission is carried out automatically in accordance with an operation condition of an associated motor vehicle.

3. An automatic transmission of a motor vehicle as claimed in claim 1, in which the shift mechanism further includes a one-way clutch and in which the frictional element is a brake that is connected to the one-way clutch in a parallel manner.

4. An automatic transmission of a motor vehicle as claimed in claim 3, in which the first speed stage constitutes a first forward speed of the transmission and the second speed stage constitutes one of second, third, fourth, fifth and sixth forward speeds of the transmission.

5. An automatic transmission of a motor vehicle as claimed in claim 1, in which the control section is so configured that when, during a shift from the second speed stage to the first speed stage under the first shift mode, a mode change from the first shift mode to the second shift mode is needed, the releasing operation of the frictional element is carried out by using the data of the first dada section.

6. An automatic transmission of a motor vehicle as claimed in claim 5, in which the control section is so configured as to smoothly and slowly release the engaged condition of the frictional element.

7. An automatic transmission of a motor vehicle as claimed in claim 1, in which the automatic transmission is of a six forward speeds and one reverse type and comprises a double pinion type planetary gear unit, a first single pinion type planetary gear unit and a second single pinion type planetary gear unit which are operatively connected to one another through various frictional elements one of which is the given frictional element.

8. An automatic transmission of a motor vehicle, comprising:
   a shift mechanism including a frictional element that establishes and disestablishes an engine brake when engaged and disengaged respectively, the shift mechanism having a first speed stage in which the frictional element is able to be engaged and disengaged selectively and a second speed stage in which the friction element is disengaged; and
   a control section that controls a switching between the engagement of the frictional element and disengagement of the same and a switching between the first speed stage and the second speed stage;
   a first data section having a data for controlling operation of the frictional element, the first data section being used by the control section to provide a first shift mode that controls a shift between the first speed stage of the type that needs the engagement of the frictional element and the second speed stage;
   a second data section lacking the data for controlling operation of the frictional element, the second data section being used by the control section to provide a second shift mode that controls a shift between the first speed stage of the type that needs the disengagement of the frictional element and the second speed stage;

wherein when, during a shift from the second speed stage to the first speed stage under the first shift mode, a mode change instruction to the second shift mode is produced and a shift to the second speed stage is needed, the control section finishes the shift to the first speed stage under the first shift mode and then carries out a control of the shift from the first speed stage to the second speed stage under the second shift mode with reference to the data of the first data section.

9. An automatic transmission of a motor vehicle as claimed in claim 8, in which the transmission is of a six forward speeds and one reverse type including a double pinion type planetary gear unit, a first single pinion type planetary gear unit and a second single pinion type planetary gear unit which are operatively connected to one another through various frictional elements one of which is the given frictional element, and in which the first shift mode is a manual shift mode wherein the shift of the transmission is manually carried out and the second shift mode is an automatic shift mode wherein the shift of the transmission is automatically carried out.

* * * * *